United States Patent
Isojima et al.

(10) Patent No.: US 9,541,682 B2
(45) Date of Patent: Jan. 10, 2017

(54) DISPLAY DEVICE

(71) Applicant: DAI NIPPON PRINTING CO., LTD., Tokyo (JP)

(72) Inventors: Seiichi Isojima, Tokyo (JP); Hiroshi Kojima, Tokyo (JP); Hiroki Nakagawa, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 14/832,269

(22) Filed: Aug. 21, 2015

(65) Prior Publication Data
US 2016/0054486 A1    Feb. 25, 2016

(30) Foreign Application Priority Data

Aug. 22, 2014 (JP) ................. 2014-169872
Jan. 29, 2015 (JP) ................. 2015-015630

(51) Int. Cl.
*F21V 5/00* (2015.01)
*G02B 5/02* (2006.01)
*F21V 9/16* (2006.01)

(52) U.S. Cl.
CPC ............. *G02B 5/0242* (2013.01); *F21V 5/002* (2013.01); *F21V 9/16* (2013.01); *G02B 5/0226* (2013.01)

(58) Field of Classification Search
CPC ....... G02B 5/0242; G02B 5/0226; F21V 9/16; F21V 5/002
USPC ........................ 362/330, 97.1–97.4
See application file for complete search history.

(56) References Cited

U.S. PATENT DOCUMENTS

| | | | | |
|---|---|---|---|---|
| 6,155,699 | A * | 12/2000 | Miller | H01L 33/46 257/95 |
| 6,217,176 | B1 * | 4/2001 | Maekawa | G02B 1/111 359/599 |
| 6,472,765 | B1 * | 10/2002 | Sano | H01L 33/505 257/100 |
| 6,572,961 | B1 * | 6/2003 | Koyama | G02B 1/105 428/212 |

(Continued)

FOREIGN PATENT DOCUMENTS

| | | |
|---|---|---|
| CN | 103069331 | 4/2013 |
| JP | 2003-107214 | 4/2003 |

(Continued)

*Primary Examiner* — Bryon T Gyllstrom
(74) *Attorney, Agent, or Firm* — Hamre, Schumann, Mueller & Larson, P.C.

(57) ABSTRACT

The present invention provides a display device having excellent light energy conversion efficiency. The present invention relates to a display device including a light-diffusing layered body. The light-diffusing layered body includes a wavelength conversion layer containing optically isotropic semiconductor particles and a light-diffusing layer on at least one surface of the wavelength conversion layer. The light-diffusing layer contains a binder component and light-diffusing particles that contain an organic material or an inorganic material. The light-diffusing particles protrude in a range of 3 to 50% of the particle size of the light-diffusing particles from an outermost surface of the light-diffusing layer. The light-diffusing layer has projections and depressions on the outermost surface due to the light-diffusing particles protruding therefrom. The light-diffusing layer has a film thickness of 1 to 30 μm.

4 Claims, 2 Drawing Sheets

(56) References Cited

U.S. PATENT DOCUMENTS

| | | | | |
|---|---|---|---|---|
| 6,710,923 | B2* | 3/2004 | Ito | G02B 5/0278 359/599 |
| 7,525,731 | B2* | 4/2009 | Aro | G02B 5/0226 359/599 |
| 7,722,225 | B2* | 5/2010 | Hwang | G02B 5/0226 264/1.7 |
| 7,784,954 | B1* | 8/2010 | Coleman | G02B 5/021 362/19 |
| 2002/0043926 | A1* | 4/2002 | Takahashi | C03C 3/045 313/503 |
| 2002/0150722 | A1* | 10/2002 | Suzuki | C08J 7/04 428/141 |
| 2002/0180351 | A1* | 12/2002 | McNulty | B82Y 20/00 313/512 |
| 2006/0056021 | A1* | 3/2006 | Yeo | G02B 5/0242 359/460 |
| 2007/0201246 | A1* | 8/2007 | Yeo | G02B 6/0051 362/627 |
| 2010/0327306 | A1 | 12/2010 | Van Der Burgt et al. | |
| 2012/0002397 | A1* | 1/2012 | Iwata | G02B 1/111 362/97.1 |
| 2013/0062654 | A1 | 3/2013 | Taima et al. | |
| 2013/0194783 | A1* | 8/2013 | Kang | G02B 6/0023 362/97.1 |
| 2014/0036528 | A1* | 1/2014 | Kim | G02B 6/26 362/606 |
| 2014/0307465 | A1 | 10/2014 | Choi et al. | |

FOREIGN PATENT DOCUMENTS

| | | |
|---|---|---|
| JP | 2010-056337 | 3/2010 |
| JP | 2013-539170 | 10/2013 |
| JP | 2013-544018 | 12/2013 |
| JP | 2014-002968 | 1/2014 |
| JP | 2014-500983 | 1/2014 |
| KR | 10-2010-0074354 | 7/2010 |
| KR | 10-2013-0123718 | 11/2013 |
| TW | 200921934 | 5/2009 |
| TW | 201000600 | 1/2010 |
| TW | 201323784 | 6/2013 |
| TW | 201331647 | 8/2013 |
| WO | 2011/148823 | 12/2011 |
| WO | 2012/023679 | 2/2012 |
| WO | 2012/064562 | 5/2012 |
| WO | 2013/056009 | 4/2013 |
| WO | 2014/057680 | 4/2014 |

\* cited by examiner

DISPLAY DEVICE

TECHNICAL FIELD

The present invention relates to a display device.

BACKGROUND ART

Display devices such as liquid crystal display devices generally have a backlight on the backside, the side opposite the display screen. A known display device has, for example, a light-diffusing layer and a prism on the display screen side of the backlight in order to improve luminance of the display screen.

A recently known backlight for display devices has a wavelength conversion layer containing semiconductor particles to convert light wavelength. In such a backlight, white light is provided through several wavelength conversion processes (for example, see Patent Literatures 1 and 2).

However, in the case of producing white light through such a wavelength conversion layer, the luminous efficiency may be insufficiently improved depending on the type of the semiconductor particles in the wavelength conversion layer or the light-diffusing layer formed on at least one surface of the wavelength conversion layer. Particularly, when the display device has a wavelength conversion layer containing optically isotropic semiconductor particles and a light-diffusing layer containing ultrafine particles with a size of the order of nanometers as diffusing particles, the light energy conversion efficiency of the entire backlight is not significantly improved.

Another known display device has a wavelength conversion layer containing diffusing particles to achieve improved light energy conversion efficiency.

However, for a display device with such a diffusing particle-containing wavelength conversion layer, more materials need to be dispersed in the binder component of the composition for producing the wavelength conversion layer. This increases the number of factors to consider upon dispersion, such as semiconductor particles, diffusing particles, and other particles, and binder components. This may complicate the production of a wavelength conversion layer capable of providing desired properties.

Moreover, since the wavelength conversion layer is relatively thick, addition of diffusing particles throughout the wavelength conversion layer increases its haze. Even though the addition of diffusing particles increases the light energy conversion efficiency, such an increase in haze may decrease the amount of light from the wavelength conversion layer toward the display screen.

CITATION LIST

Patent Literature

Patent Literature 1: JP 2013-539170 T
Patent Literature 2: JP 2013-544018 T

SUMMARY OF INVENTION

Technical Problem

In view of the above state of the art, the present invention aims to provide a display device excellent in light energy conversion efficiency.

Solution to Problem

The present invention relates to a display device comprising a light-diffusing layered body, the light-diffusing layered body including a wavelength conversion layer containing optically isotropic semiconductor particles and a light-diffusing layer on at least one surface of the wavelength conversion layer, the light-diffusing layer containing a binder component and light-diffusing particles that contain an organic material or an inorganic material, the light-diffusing layer having projections and depressions on the outermost surface due to the light-diffusing particles protruding therefrom, the light-diffusing particles protruding in a range of 3 to 50% of a particle size of the light-diffusing particles from an outermost surface of the light-diffusing layer, the light-diffusing layer having a film thickness of 1 to 30 µm.

Preferably, in the display device of the present invention, the light-diffusing particles contained in the light-diffusing layer are arranged to form a layer, and 70% or more of the light-diffusing particles arranged to form the layer are not stacked.

Preferably, in the display device of the present invention, a difference in refractive index between the light-diffusing particles and the binder component in the light-diffusing layer is 0.02 to 0.15.

Preferably, in the display device of the present invention, the wavelength conversion layer contains optically isotropic semiconductor particles, a binder resin, and internal scattering particles, and the internal scattering particles have a higher refractive index than the binder resin.

The following will describe the present invention in detail.

The "resin" as used herein includes monomers, oligomers, and the like, if not otherwise specified.

After intensive studies, the present inventors have found that excellent light energy conversion efficiency can be achieved by a display device including a light-diffusing layered body provided with a wavelength conversion layer containing optically isotropic semiconductor particles and a light-diffusing layer having projections and depressions in a specific form on the outermost surface due to light-diffusing particles. The inventors thus completed the present invention.

The display device of the present invention includes a light-diffusing layered body. The light-diffusing layered body includes a wavelength conversion layer containing optically isotropic semiconductor particles (hereinafter, also referred simply to as semiconductor particles) and a light-diffusing layer on at least one surface of the wavelength conversion layer.

The semiconductor particles refer to particles that generate light of different wavelengths depending on their particle size when irradiated with light. Generally, semiconductor particles with a smaller particle size generate light of a shorter wavelength, and semiconductor particles with a greater particle size generate light of a longer wavelength.

In the display device of the present invention, the semiconductor particles are optically isotropic particles.

The optically isotropic particles as used herein mean particles that cause Rayleigh scattering when irradiated with light. Examples of such particles include particles with an average particle size that is about a tenth or less of the wavelength of incident light. Preferably, these optically isotropic particles are observed to be spherical when the cross section of the wavelength conversion layer is observed with a TEM or STEM at a magnification of 100,000 to 300,000 (accelerating voltage: 10 to 30 kV).

In conventional display devices, the wavelength conversion layer contains both optically isotropic particles and optically anisotropic particles. However, in the display device of the present invention, the semiconductor particles of the wavelength conversion layer are specialized optically isotropic particles. Examples of the optically anisotropic particles include particles that cause Mie scattering when irradiated with light. These optically anisotropic particles generally have a greater particle size than the optically isotropic particles.

Figure 1:
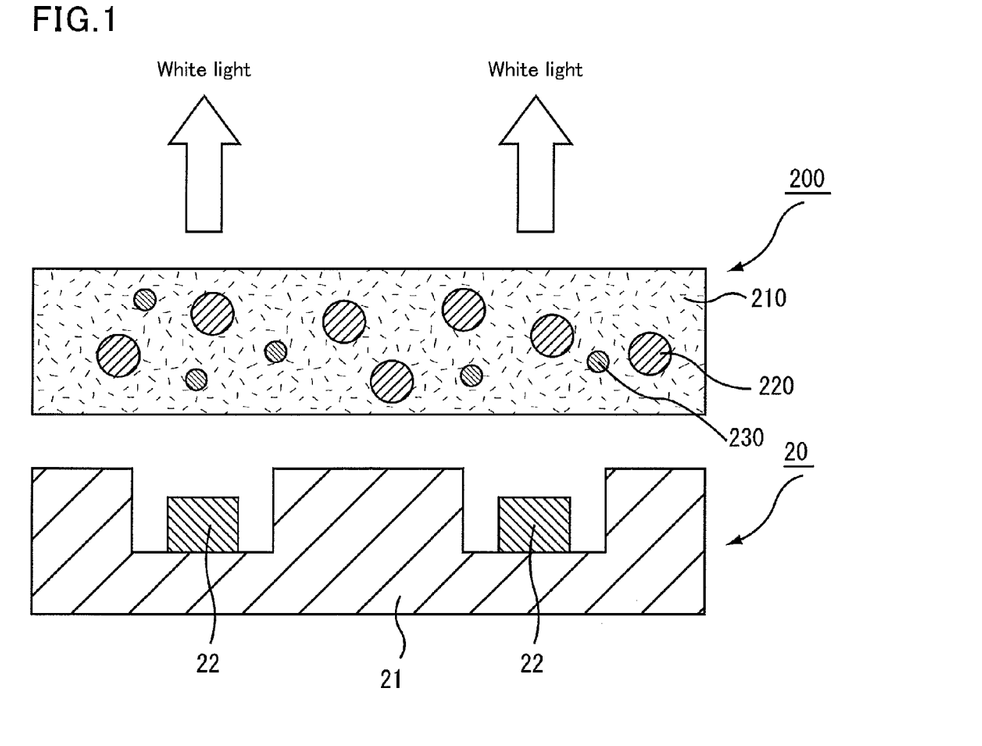
FIG. 1 is a cross-sectional view schematically showing an example of a backlight source in the display device of the present invention with a wavelength conversion layer containing semiconductor particles.

FIG. 1 is a cross-sectional view schematically showing an example of a backlight source in the display device of the present invention with a wavelength conversion layer containing semiconductor particles.

As shown in FIG. 1, the backlight source includes a light source 20 and a wavelength conversion layer 200. The light source 20 includes a frame 21 and blue LEDs 22 in concaves formed in the surface of the frame 21 on the wavelength conversion layer 200 side. The wavelength conversion layer 200 contains semiconductor particles (red semiconductor particles 220 and green semiconductor particles 230) dispersed in a binder resin 210.

Blue light emitted from the blue LEDs 22 of the light source 20 is subjected to wavelength conversion via the red semiconductor particles 220 and green semiconductor particles 230 in the wavelength conversion layer 200. The resulting red light and green light are mixed with blue light transmitted through the wavelength conversion layer 200, thus producing white light.

In the display device of the present invention, in order to improve light energy conversion efficiency, the wavelength conversion layer 200 needs to transmit blue light emitted from the light source 20 many times. In the display device of the present invention, since the light-diffusing layer (described later) is disposed on at least one surface of the wavelength conversion layer 200, the wavelength conversion layer 200 can transmit blue light many times, resulting in improved light energy conversion efficiency.

The research by the present inventors have revealed that the improvement in light energy conversion efficiency due to the light-diffusing layer is closely related with the projections and depressions formed on the outermost surface of the light-diffusing layer. The inventors achieve excellent light energy conversion efficiency by forming hemispherical projections and depressions in a predetermined form on the outermost surface of the light-diffusing layer. Particularly, in the display device of the present invention, predetermined projections and depressions are preferably formed on the outermost surface of the light-diffusing layer using particles. A light diffusing layer with such projections and depressions improves versatility as well as the light energy conversion efficiency, and also allows internal scattering to be utilized. In addition, such a light diffusing layer suitably prevents other sheets from adhering to the light-diffusing layer.

The light-diffusing layer is described later.

Generally, the semiconductor particle typically includes a core and a shell coating the core, and the shell has a polymer-coated outer surface.

The core and the shell of the semiconductor particles are not limited. Examples include CdSe, CdTe, CdS, ZnO, ZnS, ZnSe, InP, and PbSe.

The semiconductor particles may have any average particle size. For example, the average size is preferably 2 to 50 nm. Semiconductor particles with a smaller particle size generate light of a shorter wavelength, and those with a greater particle size generate light of a longer wavelength. Accordingly, if the semiconductor particles are green semiconductor particles 230 and red semiconductor particles 220, the green semiconductor particles 230 are formed such that they have a smaller particle size than the red semiconductor particles 220. Specifically, the size of the red semiconductor particles 220 may be, for example, 6 nmϕ to 8 nmϕ, and that of the green semiconductor particles 230 may be, for example, 2 nmϕ to 4 nmϕ.

The semiconductor particles may have any shape as long as they are optically isotropic. For example, the semiconductor particles may have any cross sectional shape such as a circular, triangular, quadrangular, or oval cross-sectional shape. The semiconductor particles preferably have a circular cross-sectional shape because such particles are optically isotropic.

The average particle size of the semiconductor particles is the average of the particle sizes of 20 semiconductor particles measured in observation of the cross section of the wavelength conversion layer with a TEM, STEM, or SEM.

The binder resin 210 is not limited, and may be a conventionally known material. Specifically, for example, resins such as silicone resin, epoxy resin, and acryl resin can be used alone or in any combination.

The backlight source with the wavelength conversion layer containing semiconductor particle may contain any other component. The other component is not limited, and may contain the same components as conventionally known backlight sources with a wavelength conversion layer containing semiconductor particles.

The wavelength conversion layer can be produced by, for example, mixing the above-mentioned semiconductor particles, monomer components of the binder resin, and optionally known solvent and photopolymerization initiator to prepare a composition for a wavelength conversion layer, followed by applying, drying, and curing the composition for a wavelength conversion layer by known methods.

In the present invention, the wavelength conversion layer preferably contains the above-mentioned optically isotropic semiconductor particles, a binder resin, and internal scattering particles to the extent that they do not inhibit the effects provided by a specific light-diffusing layer (described later). With the internal scattering particles, the wavelength conversion layer can have improved light energy conversion efficiency.

The internal scattering particles preferably have a higher refractive index than the binder resin. If the internal scattering particles have a lower refractive index than the binder resin, the light energy conversion efficiency of the wavelength conversion layer may not be improved. Specifically, the refractive index of the internal scattering particle is preferably higher than that of the binder resin by 0.05 or more.

The internal scattering particles may be any particles that satisfy the relation of the refractive index values, and may be organic fine particles or inorganic fine particles. Among these particles, inorganic particles are preferred, and aluminum, titanium, zirconium, and zinc inorganic particles are more preferred. Specific examples of the internal scattering particles include alumina fine particles, titania fine particles, zirconia fine particles, and zinc oxide fine particles.

These internal scattering particles preferably have an average particle size that is smaller than the film thickness of the wavelength conversion layer. The amount of the internal scattering particles is appropriately selected such that amount of light from the wavelength conversion layer toward the display screen can be maintained in a practical range, with taking into account factors such as the difference in refractive index between the internal scattering particles and the binder resin or the average particle size. The amount is not limited, and is preferably 0.5 to 50 parts by mass based on 100 parts by mass of the binder resin, more preferably 1 to 30 parts by mass.

In the case that the wavelength conversion layer contains internal scattering particles, the light-diffusing layered body including a light-diffusing layer on at least one surface of the wavelength conversion layer preferably has an internal haze that is greater than the external haze. Even if the external haze of the light-diffusing layered body is greater than the internal haze, since the wavelength conversion layer contains the internal scattering particles, the light-diffusing layered body can have improved light energy conversion efficiency as compared with a light-diffusing layered body including a wavelength conversion layer free of internal scattering particles. However, if the internal haze of the light-diffusing layered body is greater than the external haze, the light-diffusing layered body can have further improved light energy conversion efficiency. This is because an internal haze value greater than the external haze value allows light to be scattered several times inside the light-diffusing layered body, which extends the light path length, thus increasing the opportunities of wavelength conversion.

The internal haze and the external haze are related with each other. Specifically, an increase in the internal haze decreases the external haze even if the projections and depressions on the surface of the light-diffusing layered body remains the same. This is because the haze value is the proportion of the transmitted light component scattered at 2.5° or more from the incident angle of the light incident to the light-diffusing layered body. In the case of a light-diffusing layered body with a great internal haze, even if light diffused inside is further diffused by the projections and depressions on the surface of the light-diffusing layered body, the amount of light component diffused at 2.5° or less, which can affect the haze value, is small, resulting in a small external haze.

The internal haze and external haze of the light-diffusing layered body can be determined using a haze meter (HM-150, available from Murakami Color Research Laboratory Co., Ltd.) in accordance with JIS K 7136.

Figure 2:
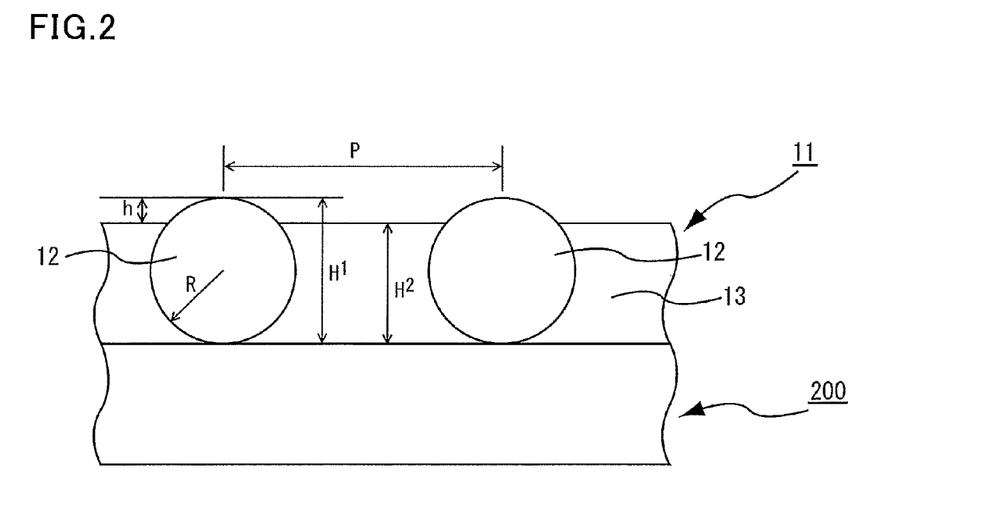
FIG. 2 is a cross-sectional view schematically showing an example of a light-diffusing layered body in the display device of the present invention.

FIG. 2 is a cross-sectional view schematically showing an example of a light-diffusing layered body in the display device of the present invention. The light-diffusing layered body includes a light-diffusing layer 11 on one surface of a wavelength conversion layer 200.

In the display device of the present invention, the light-diffusing layer 11 constituting the light-diffusing layered body contains a binder component 13 and light-diffusing particles 12 containing an organic material or an inorganic material.

In the display device of the present invention, the light-diffusing layer has a film thickness of 1 to 30 µm. If the film thickness if less than 1 µm, the light-diffusing properties of the light-diffusing layer are insufficient, resulting in insufficient improvement in the light energy conversion efficiency. If the film thickness is more than 30 µm, the light-diffusing layer has a reduced transmittance. The lower limit of the film thickness of the light-diffusing layer is preferably 2 µm. The upper limit thereof is preferably 20 µm.

The film thickness of the light-diffusing layer means the shortest distance $H^1$ from the interface between the light-diffusing layer 11 and the wavelength conversion layer 200 to the protruding most distal tip of a light-diffusing particle 12, as shown in FIG. 2. The film thickness is the average of the film thicknesses measured at freely-selected 20 sites by microscopic observation of the cross section of the light-diffusing layer. The film thickness of the light-diffusing layer can be measured by, for example, observing the cross section of the light-diffusing layer with a TEM, STEM, or SEM. For observation of the cross section of the light-diffusing layer with a TEM or STEM, the magnification is preferably 1,500 to 20,000 (accelerating voltage: 30 kV or greater), depending on the film thickness of the light-diffusing layer. For observation of the cross section of the light-diffusing layer with a SEM, the magnification is preferably 500 to 10,000 (accelerating voltage: 1 to 15 kV), depending on the film thickness of the light-diffusing layer.

In the display device of the present invention, the binder film thickness in the light-diffusing layer is preferably 0.5 to 20 µm. If the binder film thickness is less than 0.5 µm, the light-diffusing layer has insufficient light-diffusing properties, which may result in insufficient improvement in the light energy conversion efficiency. If the binder film thickness is more than 20 µm, the light-diffusing layer may have a reduced transmittance. The lower limit of the binder film thickness in the light-diffusing layer is more preferably 1 µm, whereas the upper limit thereof is more preferably 15 µm.

As shown in FIG. 2, the binder film thickness means the shortest distance $H^2$ from the interface between the light-diffusing layer 11 and the wavelength conversion layer 200 to a surface of the light-diffusing layer 11 free of light-diffusing particles 12. The binder film thickness is the average of binder film thicknesses measured at freely-selected 20 sites by observing the cross section of the light-diffusing layer. Here, in the measurement of the binder film thickness, meniscus portions formed by the contact of the light-diffusing particles and the binder component are excluded.

As shown in FIG. 2, in the display device of the present invention, the light-diffusing layer 11 has projections and depressions on the outermost surface due to the light-diffusing particles 12 protruding therefrom.

The light-diffusing particles 12 are preferably spherical. The projections and depressions formed due to the protruding light-diffusing particles 12 are thus hemispherical. The projections and depressions in such a shape on the outermost surface allow the display device of the present invention to have even better light energy conversion efficiency.

The "outermost surface" means the surface of the light-diffusing layer which is opposite the wavelength conversion layer side and free of light-diffusing particles. Accordingly, the thickness $H^2$ of the binder film is the shortest distance from the interface between the light-diffusing layer and the wavelength conversion layer to the surface of the light-diffusing layer free of light-diffusing particles, that is, the outermost surface.

In the display device of the present invention, the light-diffusing particles 12 protrude in the range of 3 to 50% of the particle size (2R) of the light-diffusing particles 12 from the outermost surface of the light-diffusing layer 11. Accordingly, the h in FIG. 2 is within the range of 3 to 50% of the particle size (2R) of the light-diffusing particles 12. This range is calculated by [(h/2R)×100]. If the h is less than 3% of the 2R, the display device of the present invention have insufficiently improved light energy conversion efficiency. If the h is more than 50% of the 2R, the light-diffusing particles 12 are likely to drop off. The lower limit of the proportion of the h to the 2R is preferably 5%, more preferably 10%, still more preferably 20%. The upper limit thereof is preferably 40%, more preferably 30%.

That the projections and depressions are formed on the outermost surface of the light-diffusing layer due to the protruding light-diffusing particles can be confirmed by observing that the head of the light-diffusing particles protrudes above the binder film (described later) in microscopic observation of the cross section of the light-diffusing layer. The degree of protrusion mentioned above can also be measured by microscopic observation of the cross section of the light-diffusing layer.

In the display device of the present invention, the light-diffusing particles protruding from the outermost surface of the light-diffusing layer may have very small amounts of the binder component, such as a several-nanometer thick film of the binder component, on the protruding portions. The presence of such a very small amount of the binder component does not change the light-diffusing properties provided by the optical refractive index of the light-diffusing particles. The film thickness of the film of the binder component can be measured by, for example, observing the cross section of the light-diffusing layer with a TEM, STEM or SEM. For observation of the cross section of the light-diffusing layer with a TEM or STEM, the magnification is preferably 1,500 to 20,000 (accelerating voltage: 30 kV or greater), depending on the particle size of the light-diffusing particles. For observation of the cross section of the light-diffusing layer with a SEM, the magnification is preferably 500 to 10,000 (accelerating voltage: 1 to 15 kV), depending on the particle size of the light-diffusing particles to be used.

The amount of the light-diffusing particles in the light-diffusing layer is not limited. The amount is preferably 15 to 85% by mass in the light-diffusing layer. The lower limit is more preferably 25% by mass, whereas the upper limit is more preferably 75% by mass. If the amount is less than 15% by mass, the light-diffusing layer may have insufficient light-diffusing properties, which may result in insufficient improvement in the light energy conversion efficiency. If the amount is more than 85% by mass, the light-diffusing layer may have a reduced transmittance, which may reduce the luminance of the display device of the present invention.

The interval between light-diffusing particles, that is, the interval P shown in FIG. 2, is preferably one to ten times, more preferably one times the average particle size of the light-diffusing particles. If the interval P is more than ten times the average particle size, the light-diffusing layer may have insufficient light-diffusing properties, which may result in insufficient improvement in the light energy conversion efficiency. If the interval is one times the average particle size, the light-diffusing particles in the light-diffusing layer are arranged to form a layer, and not stacked in the thickness direction of the light-diffusing layer, theoretically achieving closest packing. As a result, the light-diffusing layer can have excellent light-diffusing properties.

Preferably, in the light-diffusing layer, the light-diffusing particles are arranged to form a layer, and 70% or more of the light-diffusing particles arranged to form the layer are not stacked. If the amount of the light-diffusing particles that are not stacked is less than 70%, the light-diffusing layer of the display device of the present invention has a reduced transmittance, which may reduce the luminance of the display device of the present invention. The amount of the light-diffusing particles that are not stacked is preferably 75% or more, more preferably 80% or more.

The phrase "70% or more of the light-diffusing particles arranged to form the layer are not stacked" means that, of 100 light-diffusing particles observed with a microscope on any cross section of the light-diffusing layer in the thickness direction, 70 or more (i.e., 70% or more) are not stacked in the thickness direction of the light-diffusing layer.

The difference in refractive index between the binder component and the light-diffusing particles in the light-diffusing layer is preferably 0.02 to 0.15. If the difference is less than 0.02, the light-diffusing properties provided by the optical refractive index of the light-diffusing particles are not obtained, which may result in insufficient improvement in the light energy conversion efficiency of the display device of the present invention. If the difference is more than 0.15, the light-diffusing layer has a reduced transmittance, which may reduce the luminance of the display device of the present invention. The lower limit of the difference in refractive index between the binder component and the light-diffusing particles in the light-diffusing layer is more preferably 0.03, and the upper limit is more preferably 0.12.

The binder component may have a larger refractive index than the light-diffusing particles, or the light-diffusing particles may have a larger refractive index than the binder component.

The refractive index of the light-diffusing particles before they are added to the light-diffusing layer can be measured by, for example, a Becke's method, a minimum deviation method, a deviation analysis, a mode-line method, or an ellipsometry method. The refractive index of the binder component can be obtained by measuring the refractive index of a cured film consisting only of the binder component with an Abbe refractometer. The cured film is prepared by applying, drying, and curing a light-diffusing layer-forming coating liquid free of light-diffusing particles.

The refractive index of the binder component (cured product) and the light-diffusing particles in the light-diffusing layer can be measured by the same methods as described above using pieces of the light-diffusing particles or the binder component taken from the prepared light-diffusing layer by any means. The difference in refractive index between the binder component and the light-diffusing agent can be measured with a phase-shift laser interference microscope (e.g., a phase-shift laser interference microscope available from FK Opt labo Co., Ltd., a two-beam interference microscope available from Mizojiri Optical Co., Ltd.).

If the binder component contains (meth)acrylate (described later) and other resins, the refractive index of the binder component means the average refractive index of a cured product composed of all the resin components excluding the light-diffusing particles.

The light-diffusing particles preferably have an average particle size of, for example, 1 to 30 µm, more preferably 1 to 20 µm. If the average particle size is less than 1 µm, the display device of the present invention may have insufficient light energy conversion efficiency, requiring more light-diffusing particles for sufficient light-diffusing properties. If the average particle size is more than 30 µm, although excellent light-diffusing properties can be achieved, the light transmittance of the light-diffusing layer is likely to be significantly reduced.

The average particle size of the light-diffusing particles can be measured by the same method as that of the semiconductor particles, The average particle size of the light-diffusing particles means the average value of the particle sizes of the particles if the light-diffusing particles in the light-diffusing layer are monodispersed particles (particles with a single shape). If the particles are irregularly shaped particles having a broad particle size distribution, the average particle size refers to the particle size of the most common particles found by particle size distribution measurement.

If the light-diffusing particles are not spherical but have an irregular shape such as a flat shape, the average particle size of the light-diffusing particles means the value determined by selecting 20 light-diffusing particles in observation of the cross section of the diffusing layer with an electron microscope (e.g., TEM, STEM, SEM), measuring the maximum size and the minimum size of the selected light-diffusing particles, and calculating the average of the measured size.

If the particles are irregularly shaped particles having a broad particle size distribution, light-diffusing particles with a particle size greater than the film thickness of the binder layer have the surface diffusing effects. Light-diffusing particles with a particle size smaller than the film thickness of the binder layer have the internal diffusing effects. These particles can synergistically improve the light energy conversion efficiency.

If the wavelength conversion layer contains the internal scattering particles mentioned above, or if the light-diffusing layer contains light-diffusing particles with a particles size that provides the internal diffusing effect, the interval of light-diffusing particles mentioned above, that is, the interval P shown in FIG. 2, is preferably more than one times the average particle size of the light-diffusing particles. With such an interval P, the internal haze of the light-diffusing layered body can be adjusted to be higher than the external haze, allowing the display device of the present invention to be markedly excellent in the light energy conversion efficiency.

If the light-diffusing particles have an irregular shape such as a flat shape, the observation of the cross section of the light-diffusing layer with an electron microscope shows that the light-diffusing particles partially form layers in the light-diffusing layer. This can improves the light energy conversion efficiency.

In the display device of the present invention, the light-diffusing particles preferably have an average particle size of 100 to 20,000 times, more preferably 100 to 5,000 times the average particle size of the semiconductor particles. If the average particle size is less than 100 times, the light-diffusing layer may not have sufficient light-diffusing properties. If the average particle size is more than 20,000 times, although excellent light-diffusing properties of the light-diffusing layer can be achieved, the light transmittance of the light-diffusing layer is likely to be significantly reduced.

The organic material for the light-diffusing particles is not limited. Examples thereof include polyester, polystyrene, melamine resin, (meth)acrylic resin, acryl-styrene copolymer resin, silicone resin, benzoguanamine resin, benzoguanamine-formaldehyde condensation resin, polycarbonate, polyethylene, and polyolefin. Particularly, crosslinked acrylic resin is suitably used.

The inorganic material for the light-diffusing particles is not limited. Examples thereof include inorganic oxides such as silica, alumina, titania, tin oxide, antimony-doped tin oxide (abbreviation: ATO), and zinc oxide fine particles. Particularly, silica and/or alumina are/is suitably used.

The light-diffusing layer contains a binder component.

The binder component preferably contains a polymer (crosslinked product) of a photopolymerizable compound.

The binder component may contain, in addition to the polymer (crosslinked product) of a photopolymerizable compound, a solvent-drying resin or a thermosetting resin.

The photopolymerizable compound contains at least one photopolymerizable functional group. The "photopolymerizable functional group" as used herein means a functional group that can polymerize when irradiated with light.

Examples of the photopolymerizable functional groups include ethylenic double bonds such as (meth)acryloyl group, vinyl group, and allyl group. The "(meth)acryloyl group" includes both "acryloyl group" and "methacryloyl group."

Example of light irradiated for the polymerization of the photopolymerizable compound include visible light and ionizing radiation such as ultraviolet rays, X-rays, electron rays, $\alpha$ rays, $\beta$ rays, and $\gamma$ rays.

Examples of the photopolymerizable compound include a photopolymerizable monomer, a photopolymerizable oligomer, and a photopolymerizable polymer. These may be appropriately adjusted before use.

Preferable photopolymerizable compounds include a combination of a photopolymerizable monomer and a photopolymerizable oligomer or a photopolymerizable polymer.

Preferable photopolymerizable monomers include multi-functional monomers containing two or more photopolymerizable functional groups (i.e., bi- or higher functional monomers).

Examples of the bi- or higher functional monomers include trimethylolpropane tri(meth)acrylate, tripropyleneglycol di(meth)acrylate, diethyleneglycol di(meth)acrylate, dipropyleneglycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentylglycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerol tetra(meth)acrylate, adamanthyl di(meth)acrylate, isobornyl di(meth)acrylate, dicyclopentane di(meth)acrylate, tricyclodecan di(meth)acrylate and PO- or EO-modified products thereof.

From the viewpoint of obtaining a light-diffusing layer with high hardness, pentaerythritol triacrylate (PETA), dipentaerythritol hexaacrylate (DPHA), pentaerythritol tetraacrylate (PETTA), and dipentaerythritol pentaacrylate (DPPA) are preferred.

The photopolymerizable oligomer has a weight average molecular weight of more than 1,000 and not more than 10,000.

The photopolymerizable oligomer is preferably a bi- or higher multifunctional oligomer, preferably a multifunctional oligomer containing three or more photopolymerizable functional groups (i.e., tri- or higher functional oligomer).

Examples of the multifunctional oligomer include polyester (meth)acrylate, urethane(meth)acrylate, polyester-urethane(meth)acrylate, polyether(meth)acrylate, polyol(meth)acrylate, melamine(meth)acrylate, isocyanurate(meth)acrylate, and epoxy(meth)acrylate.

The photopolymerizable polymer has a weight average molecular weight of more than 10,000. The weight average molecular weight is preferably more than 10,000 and not more than 80,000, more preferably more than 10,000 and not more than 40,000. If the weight average molecular weight is more than 80,000, the polymer has high viscosity, which reduces the coatability and may deteriorate the appearance of the light-diffusing layered body to be obtained.

Examples of the multifunctional polymer include urethane(meth)acrylate, isocyanurate(meth)acrylate, polyester-urethane(meth)acrylate, and epoxy(meth)acrylate.

The solvent-drying resin is a resin that can be formed into a film by only drying the solvent added for adjusting the solids content for application. Examples thereof include thermoplastic resins. The addition of the solvent-drying resin effectively prevents defective coating on the application surface upon formation of the light-diffusing layer. The solvent-drying resin is not limited, and may be a common thermoplastic resin.

Examples of the thermoplastic resin include styrene-based resins, (meth)acrylic resins, vinyl acetate-based resins, vinyl ether-based resins, halogen-containing resins, alicyclic olefin-based resins, polycarbonate-based resins, polyester-based resins, polyamide-based resins, cellulose derivatives, silicone-based resins, rubbers, and elastomers.

The thermoplastic resin is preferably amorphous and soluble in an organic solvent (especially in a common solvent capable of dissolving multiple polymers or curable compounds) From the viewpoint of transparency and weather resistance, styrene-based resins, (meth)acrylic resins, alicyclic olefin-based resins, polyester-based resins, cellulose derivatives (cellulose esters), and the like are preferred.

The thermosetting resin is not limited. Examples thereof include phenol resin, urea resin, diallyl phthalate resin, melamine resin, guanamine resin, unsaturated polyester resin, polyurethane resin, epoxy resin, amino alkyd resin, melamine-urea co-condensation resin, silicon resin, and polysiloxane resin.

The light-diffusing layer can be formed using, for example, a composition for a light-diffusing layer containing a photopolymerizable compound to be cured into a binder component and light-diffusing particles.

Specifically, the composition for a light-diffusing layer described below is applied to one surface of the wavelength conversion layer.

The composition for a light-diffusing layer can be applied by, for example, spin coating, dipping, spraying, slide coating, bar coating, roll coating, gravure coating, die coating, or any other known application method.

The composition for a light-diffusing layer at least contains the photopolymerizable compound and light-diffusing particles described above. Additionally, the composition for a light-diffusing layer may optionally contain the thermoplastic resin and thermosetting resin described above, a solvent, and a polymerization initiator. Moreover, the composition for a light-diffusing layer may contain conventionally known additives in accordance with the purpose such as an increase in the hardness of the light-diffusing layer, suppression of curing shrinkage, and control of refractive index. Examples of the additives include dispersing agents, surfactants, antistatic agents, silane coupling agents, viscosifiers, anti-coloring agents, colorants (e.g., pigment, dyes), defoamers, leveling agents, flame retardants, ultraviolet absorbers, tackifiers, polymerization inhibitors, antioxidants, surface modifiers, and lubricants.

The solvent can be used to adjust the viscosity of the composition for a light-diffusing layer to facilitate the application, or to adjust the evaporation rate or the ability of dispersing light-diffusing particles to facilitate formation of a light-diffusing layer containing light-diffusing particles in a desired form.

Examples of the solvent include alcohols (e.g., methanol, ethanol, propanol, isopropanol, n-butanol, s-butanol, t-butanol, benzyl alcohol, PGME, ethylene glycol), ketones (acetone, methyl ethyl ketone (MEK), cyclohexanone, methyl isobutyl ketone, diacetone alcohol, cycloheptanone, diethyl ketone), ethers (1,4-dioxane, dioxolane, tetrahydrofuran), aliphatic hydrocarbons (e.g., hexane), alicyclic hydrocarbons (e.g., cyclohexane), aromatic hydrocarbons (e.g., toluene, xylene), halogenated carbons (dichloromethane, dichloroethane), esters (e.g., methyl formate, methyl acetate, ethyl acetate, propyl acetate, butyl acetate, ethyl lactate), cellosolves (e.g., methyl cellosolve, ethyl cellosolve, butyl cellosolve), cellosolve acetates, sulfoxides (e.g., dimethylsulfoxide), amides (e.g., dimethylformamide, dimethylacetamide). Mixtures thereof can be used.

The polymerization initiator is a component that is decomposed by light irradiation to generate radicals to allow the polymerization (crosslinking) of a photopolymerizable compound to start or proceed.

The polymerization initiator may be any polymerization initiator that can emit a substance that initiates radical polymerization when irradiated with light. Conventionally known polymerization initiators can be used, such as acetophenones, benzophenones, Michler's benzoyl benzoate, α-amyloxime esters, thioxanthones, propiophenones, benzyls, benzoins, and acylphosphine oxides. The polymerization initiator is preferably used in admixture with a photosensitizer. Specific examples thereof include n-butylamine, triethylamine, and poly-n-butylphosphine.

If the binder component is a resin containing a radically polymerizable unsaturated group, the polymerization initiator is preferably one of acetophenones, benzophenones, thioxanthones, benzoin, and benzoin methyl ether, or a mixture thereof.

The amount of the polymerization initiator in the composition for a light-diffusing layer is preferably 0.5 parts by mass or more and 10.0 parts by mass or less based on 100 parts by mass of the photopolymerizable compound. If the amount of the polymerization initiator is within the range, hard coat properties can be sufficiently maintained, and also curing inhibition can be suppressed.

The composition for a light-diffusing layer may have any material content (solids content). The material content is usually preferably 5% by mass or more and 70% by mass or less, more preferably 25% by mass or less and 60% by mass or less.

Preferred leveling agents include silicone oil and fluorine surfactants, which prevent the light-diffusing layer from having a Benard cell structure. When a resin composition containing a solvent is applied and dried, a difference in surface tension occurs between the surface and the inside of the coating film. This causes many convection currents in the coating film. The structure caused by the convection is called Benard cell structure. The Benard cell structure causes orange peel or coating defects on the light-diffusing layer to be formed.

The Benard cell structure may lead to too large projections and depressions on the surface of the light-diffusing layer. The use of a leveling agent such as those mentioned above can prevent the convection, resulting in a light-diffusing layer free of defects or unevenness and also facilitating the adjustment of the projections and depressions on the surface of the light-diffusing layer.

The composition for a light-diffusing layer may be prepared by any method that allows the components to be uniformly mixed. For example, the composition can be prepared using a known device, such as a paint shaker, a bead mill, a kneader, or a mixer.

After the composition for a light-diffusing layer is applied to the surface of the wavelength conversion layer, the workpiece is transported to a heated zone to dry the composition for a light-diffusing layer in the form of a coating film. The composition for a light-diffusing layer is dried by a known method, and thus the solvent is evaporated. The state of the agglomeration and distribution of the light-diffusing particles can be adjusted by selecting conditions such as the relative evaporation rate of the solvent, solids concentration, coating liquid temperature, drying temperature, speed of drying wind, drying time, and solvent atmosphere concentration of the drying zone.

Thereafter, the composition for a light-diffusing layer in the form of a coating film is irradiated with light such as ultraviolet rays to polymerize (crosslink) the photopolymerizable compound. The composition for a light-diffusing layer is thus cured, whereby a light-diffusing layer is formed.

If ultraviolet rays are used to cure the composition for a light-diffusing layer, ultraviolet rays may be emitted from, for example, a ultra-high pressure mercury lamp, a high pressure mercury lamp, a low pressure mercury lamp, a carbon-arc lamp, a xenon-arc lamp, or a metal halide lamp. The ultraviolet rays may have a wavelength in the range of 190 to 380 nm. Specific examples of electron ray sources include various electron beam accelerators such as Cockcroft-Walton type, Van de graaff type, resonance transformer type, insulated core transformer type, linear type, dynamitron type, and high-frequency type.

The light-diffusing layer with particular projections and depressions can be formed also by employing a photopolymerizable compound and a solvent-drying resin as materials for forming the binder component.

Specifically, for example, the light-diffusing layer can be formed by preparing a composition for a light-diffusing layer containing a photopolymerizable compound, a solvent-drying resin, and light-diffusing particles, forming a coating film of the composition on the wavelength conversion layer in the same manner described above, and then curing the composition for a light-diffusing layer in the same manner as described above.

In the display device of the present invention, the light-diffusing layer is disposed on at least one surface of the wavelength conversion layer.

If the light-diffusing layer is disposed on one surface of the wavelength conversion layer, the light energy conversion efficiency can be further improved. The light-diffusing layer is preferably disposed on the light source-side surface of the wavelength conversion layer.

Since retroreflection of the light irradiated from the light source can further improve the light energy conversion efficiency, the light-diffusing layer is preferably disposed on both surfaces of the wavelength conversion layer. If the light-diffusing layer is disposed on both surfaces of the wavelength conversion layer, the light-diffusing layer requires less light-diffusing particles than if the light-diffusing layer is disposed on only one surface of the wavelength conversion layer.

The light-diffusing layer can be disposed on both surfaces of the wavelength conversion layer by forming a light-diffusing layer on one surface of the wavelength conversion layer by the above-described method and then forming another light-diffusing layer on the other surface of the wavelength conversion layer by the same method.

The display device of the present invention includes a light-diffusing layered body including a wavelength conversion layer and a light-diffusing layer on at least one surface of the wavelength conversion layer. The display device of the present invention is thus excellent in light energy conversion efficiency.

The display device of the present invention may include any other component in addition to the light-diffusing layered body. It may include a conventionally known component, for example. The display device of the present invention can be especially suitably used as an image display device. For example, if the display device of the present invention is a liquid crystal display device, known prism and polarizing film are arranged on the display screen side of the light-diffusing layered body, and also other components such as a polarizer and a liquid crystal cell are arranged.

The polarizer may be any polarizer that has desired polarization properties, and may be one commonly used as a polarizer in liquid crystal display devices. Specifically, suitable polarizers include those that are made of extended polyvinyl alcohol film and contain iodine.

The liquid crystal cell is not limited. The liquid crystal cell may be one commonly known as a liquid crystal cell for a liquid crystal display device. Known liquid crystal cells for a liquid crystal display device include those for such display modes as TN, STN, VA, IPS, and OCB. In the present invention, liquid crystal cells for any of these display modes can be used.

The display device of the present invention can have excellent light energy conversion improvement rate as well as excellent light energy conversion efficiency. Specifically, the display device of the present invention preferably has a light energy conversion improvement rate of 101.0 to 130.0%, more preferably 102.0 to 122.0%, still more preferably 110.0 to 122.0%. If the upper limit of the light energy conversion improvement rate is more than 130.0%, yellow tint is likely to be notable, making it difficult to adjust white balance. In addition, the front luminance is likely to decrease due to the light-diffusing layer. If the lower limit is less than 101.0%, blue tint is likely to be notable because the light energy conversion efficiency is not improved, thus making it difficult to adjust white balance.

Advantageous Effects of Invention

The display device of the present invention, which has the above-described structure, can be excellent in light energy conversion efficiency.

DESCRIPTION OF EMBODIMENTS

The present invention will be described based on examples below. The present invention should not be construed as limited to these embodiments. If not otherwise specified, "part(s)" and "%" are based on mass.

Example 1

A layered body (hereinafter, also referred to as a wavelength conversion layered body) including a wavelength conversion layer was formed in the manner described below. A light-diffusing layer was disposed on one surface (the surface opposite the light source) of the layered body. An optical layer free of light-diffusing particles was disposed on the light source-side surface of the wavelength conversion layered body. Thus, a light-diffusing layered body was prepared.

(Preparation of Wavelength Conversion Layered Body)

A silica deposited layer was formed on one surface of Lumirror T60 (thickness: 50 µm) available from Toray Industries, Inc. to prepare a barrier film substrate.

Subsequently, a composition (1) for a wavelength conversion layer with the formulation below was applied to the silica deposited layer on the barrier film substrate. The composition was dried to form a coating film. Another barrier film prepared in the same manner was laminated on the coating film with the silica deposited layer of the other barrier film being on the coating film. The coating film was then cured by ultraviolet ray irradiation. Thus, a layered body including a wavelength conversion layer was prepared. The semiconductor particles in the wavelength conversion layer were optically isotropic particles.

(Preparation of Barrier Film Substrate)

In a high-frequency sputtering apparatus, 5 kW of high-frequency power having a frequency of 13.56 MHz was applied to electrodes to produce a discharge in the chamber. In this manner, a silica deposited layer (thickness: 50 nm, refractive index: 1.46) of a target substance (silica) was formed on one surface of Lumirror T60 available from Toray Industries, Inc.

(Composition (1) for Wavelength Conversion Layer)
UNIDIC V-5500 available from DIC Corporation 99 parts by mass
CdSe/ZnS 530 available from Sigma-Aldrich Corporation 0.2 parts by mass
CdSe/ZnS 610 available from Sigma-Aldrich Corporation 0.2 parts by mass
Photopolymerization initiator (1-hydroxycyclohexyl phenyl ketone) (Irgacure (registered trademark) 184) 1 part by mass (Preparation of Light-Diffusing Layer)

A composition (1) for a light-diffusing layer with the formulation below was applied to the surface of the wavelength conversion layered body opposite the light source, whereby a light-diffusing layer was formed. An optical layer was formed on the light source-side surface of the wavelength conversion layer using a composition with the same formulation as the composition (1) for a light-diffusing layer, except that it was free of light-diffusing particles.

The formation, drying, and curing of coating films in the process of forming the light-diffusing layer and the optical layer were performed by known methods.

The light-diffusing layer was formed such that h was 1 µm, P was 5 µm, $H^1$ was 5 µm, and $H^2$ was 4 µm provided that the radius (R) of the light-diffusing particles shown in FIG. 2 is 2.5 µm.

It was confirmed that in the prepared light-diffusing layer, the light-diffusing particles were arranged in a layer and 70% or more of the light-diffusing particles arranged to form the layer were not stacked. The difference in refractive index between the light-diffusing particles and the binder component was within the range of 0.02 to 0.15.

(Composition (1) for Light-Diffusing Layer)
Pentaerythritol triacrylate 99 parts by mass
Light-diffusing particles (crosslinked acrylic resin beads, an average particle size: 5 µm) (SSX-105, available from Sekisui Chemical Co., Ltd.) 158 parts by mass
Photopolymerization initiator (1-hydroxycyclohexyl phenyl ketone) (Irgacure (registered trademark) 184) 1 part by mass
Solvent (methyl isobutyl ketone:cyclohexanone=1:1 (mass ratio)) 387 parts by mass The obtained light-diffusing layered body was disposed on a light source mounted with blue LEDs. The light energy conversion efficiency for blue light emitted from the light source was measured by the following method. The results are shown in Table 1.

(Measurement of Light Energy Conversion Efficiency)

Figure 3:
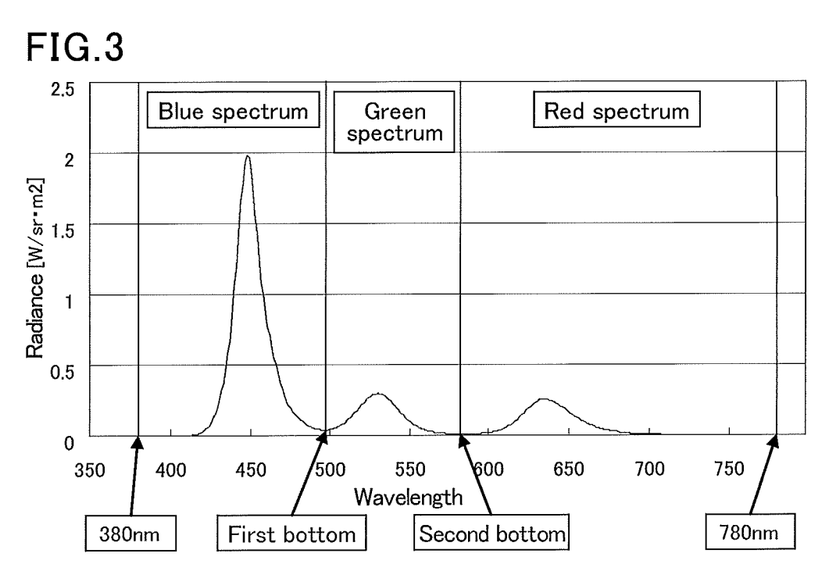
FIG. 3 is a graph schematically showing an optical spectrum obtained in measurement of light energy conversion efficiency of the present invention.

Optical spectra were measured with a spectroradiometer (SR-UL2, available from Topcon Corporation) in the presence and absence of the light-diffusing layered body. Integrated values of blue light spectrum, green light spectrum, and red light spectrum were calculated from each optical spectra. The sum of the integrated value of green light spectrum and the integrated value of the red spectrum measured in the presence of the light-diffusing layered body was calculated. The resulting sum was divided by the integrated value of blue light spectrum measured in the absence of the light-diffusing layered body. In this manner, the light energy conversion efficiency was determined. The improvement rate relative to the light energy conversion efficiency of the light-diffusing layered body according to Comparative Example 1 (described later) taken as 100.0% was calculated. The calculated improvement rate was taken as the light energy conversion improvement rate. FIG. 3 is a schematic view showing an optical spectrum measured with a spectroradiometer. As shown in FIG. 3, the blue light spectrum refers to a spectrum observed within the range from a wavelength of 380 nm to a first bottom at a longer wavelength. The green light spectrum refers to a spectrum observed within the range from the first bottom to a second bottom at a longer wavelength. The red light spectrum refers to a spectrum observed within the range from the second bottom to a wavelength of 780 nm.

The obtained light-diffusing layered body was disposed on a light source (peak wavelength: 450 nm) mounted with blue LEDs. Additionally, a prism sheet BEF III (available from 3M, thickness: 130 µm) and a polarization separation sheet DBEF (available form 3M, thickness: 400 µm) were stacked thereon. Whether blue light emitted from the light source was converted to white light via the light-diffusing layered body was checked by the following method. The results are shown in Table 1.

(Color Evaluation)

The obtained light-diffusing layered body was disposed on a light source (peak wavelength: 450 nm) mounted with blue LEDs. A prism sheet BEF III (thickness: 130 µm, available from 3M) and a polarization separation sheet DBEF (thickness: 400 µm, available from 3M) were stacked thereon. The color was visually evaluated in a dark room from the front direction according to the following criteria.
Good: white
Acceptable: white with slight blue tint
Poor: white with blue tint (Haze)

The total haze, internal haze, and external haze of the light-diffusing layered body were measured in the following manner.

First, the total haze of the light-diffusing layered body was measured with a haze meter (HM-150, available from Murakami Color Research Laboratory Co., Ltd.) in accordance with JIS K 7136. Next, a triacetylcellulose substrate (TD60UL, available from Fujifilm Corporation, 60 µm) was applied to a surface of the light-diffusing layer via a transparent optical adhesive layer (PANACLEAN PD-S1, available from Panac Corporation, thickness: 25 µm). As a result, the projections and depressions on the surface of the light-diffusing layer were crushed, and the surface was smoothed. Then, the internal haze of the light-diffusing layered body with the smoothed surface was measured with a haze meter (HM-150, available from Murakami Color Research Labo-

17 ratory Co., Ltd.) in accordance with JIS K 7136. The external haze was calculated by subtracting the internal haze from the total haze.

In the present invention, since a haze as small as the haze of the triacetylcellulose substrate or the transparent optical adhesive layer hardly affects the light conversion efficiency, the internal haze and the external haze of the light-diffusing layered body include the haze of the triacetylcellulose substrate or other members.

Example 2

A light-diffusing layered body was prepared in the same manner as in Example 1 except that the light-diffusing layer was disposed on the light source-side surface of the wavelength conversion layered body, and that the optical layer was disposed on the surface of the wavelength conversion layered body opposite the light source. The light energy conversion efficiency for blue light was measured in the same manner as in Example 1. The results are shown in Table 1.

Example 3

A light-diffusing layered body was prepared in the same manner as in Example 1 except that another light-diffusing layer was formed instead of the optical layer. The light energy conversion efficiency for blue light was measured in the same manner as in Example 1. The results are shown in Table 1.

Comparative Example 1

A light-diffusing layered body was prepared in the same manner as in Example 3 except that the light-diffusing layer was free of light-diffusing particles. The light energy conversion efficiency for blue light was measured in the same manner as in Example 1. The results are shown in Table 1.

Comparative Example 2

A light-diffusing layered body was prepared in the same manner as in Example 3 except that a composition (2) for a light-diffusing layer with the formulation below was used to form the light-diffusing layer. The light energy conversion efficiency for blue light was measured in the same manner as in Example 1. The results are shown in Table 1.
(Composition (2) for Light-Diffusing Layer)
Pentaerythritol triacrylate 99 parts by mass
Light-diffusing particles (crosslinked acrylic resin beads, average particle size: 20 μm) (SSX-120, available from Sekisui Chemical Co., Ltd) 111 parts by mass
Photopolymerization initiator (1-hydroxycyclohexyl phenyl ketone) (Irgacure (registered trademark) 184) 1 part by mass
Solvent (methyl isobutyl ketone:cyclohexanone=1:1 (mass ratio)) 317 parts by mass Example 4

A light-diffusing layered body was prepared in the same manner as in Example 3 except that the amounts of materials in the composition (2) for a light-diffusing layer were adjusted such that h, P, $H^1$, and $H^2$ listed in Table 1 were achieved. The light energy conversion efficiency for blue light was measured in the same manner as in Example 1. The results are shown in Table 1.

18

Example 5

A light-diffusing layered body was prepared in the same manner as in Example 3 except that a composition (3) for a light-diffusing layer with the formulation below was applied to form the light-diffusing layer. The light energy conversion efficiency for blue light was measured in the same manner as in Example 1. The results are shown in Table 1.
(Composition (3) for Light-Diffusing Layer)
Pentaerythritol triacrylate 99 parts by mass
Light-diffusing particles (crosslinked acrylic resin beads, average particle size: 10 μm) (SSX-110, available from Sekisui Chemical Co., Ltd) 122 parts by mass
Photopolymerization initiator (1-hydroxycyclohexyl phenyl ketone) (Irgacure (registered trademark) 184) 1 part by mass
Solvent (methyl isobutyl ketone:cyclohexanone=1:1 (mass ratio)) 333 parts by mass Examples 6 to 9

A light-diffusing layered body was prepared in the same manner as in Example 3 except that the amounts of the materials in the composition (1) for a light-diffusing layer were adjusted such that h/2R was 10% (Example 6), 30% (Example 7), 40% (Example 8), or 50% (Example 9) provided that the radius (R) of the light-diffusing particles is 2.5 μm. The light energy conversion efficiency for blue light was measured in the same manner as in Example 1. The results are shown in Table 1.

Examples 10 to 13

A light-diffusing layered body was prepared in the same manner as in Example 3 except that the amounts of the materials in the composition (3) for a light-diffusing layer were adjusted such that P was 30 μm (Example 10), 20 μm (Example 11), 17 μm (Example 12), or 14 μm (Example 13). The light energy conversion efficiency for blue light was measured in the same manner as in Example 1. The results are shown in Table 1.

Example 14

A light-diffusing layered body was prepared in the same manner as in Example 1 except that a composition (2) for a wavelength conversion layer, described below, was used to form the wavelength conversion layer instead of the composition (1) for a wavelength conversion layer. The light energy conversion efficiency for blue light was measured in the same manner as in Example 1. The results are shown in Table 1.
(Composition (2) for Wavelength Conversion Layer)
UNIDIC V-5500 available from DIC Corporation 89 parts by mass
CdSe/ZnS 530 available from Sigma-Aldrich Corporation 0.2 parts by mass
CdSe/ZnS 610 available from Sigma-Aldrich Corporation 0.2 parts by mass
Photopolymerization initiator (1-hydroxycyclohexyl phenyl ketone) (Irgacure (registered trademark) 184) 1 part by mass
MM-P (alumina particles, available from Nippon Light Metal Company, Ltd., average particle size: 1.5 μm) 10 parts by mass Example 15

A light-diffusing layered body was prepared in the same manner as in Example 1 except that a composition (3) for a wavelength conversion layer, described below, was used to form the wavelength conversion layer instead of the composition (1) for a wavelength conversion layer. The light energy conversion efficiency for blue light was measured in the same manner as in Example 1. The results are shown in Table 1.
(Composition (3) for Wavelength Conversion Layer)
UNIDIC V-5500 available from DIC Corporation 89 parts by mass
CdSe/ZnS 530 available from Sigma-Aldrich Corporation 0.2 parts by mass
CdSe/ZnS 610 available from Sigma-Aldrich Corporation 0.2 parts by mass
Photopolymerization initiator (1-hydroxycyclohexyl phenyl ketone) (Irgacure (registered trademark) 184) 1 part by mass
TZ-3YS-E (zirconia particles, available from Tosoh Corporation, average particle size: 0.1 μm) 10 parts by mass Example 16

A light-diffusing layered body was prepared in the same manner as in Example 1 except that a composition (4) for a wavelength conversion layer, described below, was used to form the wavelength conversion layer instead of the composition (1) for a wavelength conversion layer. The light energy conversion efficiency for blue light was measured in the same manner as in Example 1. The results are shown in Table 1.
(Composition (4) for Wavelength Conversion Layer)
UNIDIC V-5500 available from DIC Corporation 89 parts by mass
CdSe/ZnS 530 available from Sigma-Aldrich Corporation 0.2 parts by mass
CdSe/ZnS 610 available from Sigma-Aldrich Corporation 0.2 parts by mass
Photopolymerization initiator (1-hydroxycyclohexyl phenyl ketone) (Irgacure (registered trademark) 184) 1 part by mass
R-38L (titania particles, available from Sakai Chemical Industry Co., Ltd, average particle size: 0.4 μm) 10 parts by mass Example 17

A light-diffusing layered body was prepared in the same manner as in Example 1 except that a composition (5) for a wavelength conversion layer, described below, was used to form the wavelength conversion layer instead of the composition (1) for a wavelength conversion layer. The light energy conversion efficiency for blue light was measured in the same manner as in Example 1. The results are shown in Table 1.
(Composition (5) for Wavelength Conversion Layer)
UNIDIC V-5500 available from DIC Corporation 98 parts by mass
CdSe/ZnS 530 available from Sigma-Aldrich Corporation 0.2 parts by mass
CdSe/ZnS 610 available from Sigma-Aldrich Corporation 0.2 parts by mass
Photopolymerization initiator (1-hydroxycyclohexyl phenyl ketone) (Irgacure (registered trademark) 184) 1 part by mass
MM-P (alumina particles, available from Nippon Light Metal Company, Ltd., average particle size: 1.5 μm) 1 part by mass Example 18

A light-diffusing layered body was prepared in the same manner as in Example 1 except that a composition (6) for a wavelength conversion layer, described below, was used to form the wavelength conversion layer instead of the composition (1) for a wavelength conversion layer. The light energy conversion efficiency for blue light was measured in the same manner as in Example 1. The results are shown in Table 1.
(Composition (6) for Wavelength Conversion Layer)
UNIDIC V-5500 available from DIC Corporation 98 parts by mass
CdSe/ZnS 530 available from Sigma-Aldrich Corporation 0.2 parts by mass
CdSe/ZnS 610 available from Sigma-Aldrich Corporation 0.2 parts by mass
Photopolymerization initiator (1-hydroxycyclohexyl phenyl ketone) (Irgacure (registered trademark) 184) 1 part by mass
TZ-3YS-E (zirconia particles, available from Tosoh Corporation, average particle size 0.1 μm) 1 part by mass Example 19

A light-diffusing layered body was prepared in the same manner as in Example 1 except that a composition (7) for a wavelength conversion layer, described below, was used to form the wavelength conversion layer instead of the composition (1) for a wavelength conversion layer. The light energy conversion efficiency for blue light was measured in the same manner as in Example 1. The results are shown in Table 1.
(Composition (7) for Wavelength Conversion Layer)
UNIDIC V-5500 available from DIC Corporation 98 parts by mass
CdSe/ZnS 530 available from Sigma-Aldrich Corporation 0.2 parts by mass
CdSe/ZnS 610 available from Sigma-Aldrich Corporation 0.2 parts by mass
Photopolymerization initiator (1-hydroxycyclohexyl phenyl ketone) (Irgacure (registered trademark) 184) 1 part by mass
R-38L (titania particles, available from Sakai Chemical Industry Co., Ltd., average particle size: 0.4 μm) 1 part by mass

TABLE 1

| | R | h | P | $H^1$ | $H^2$ | h/2R | Light-diffusing layer | Light energy conversion efficiency (%) | Conversion improvement rate | Color evaluation (visual) | Total haze (%) | Internal haze (%) | External haze (%) |
|---|---|---|---|---|---|---|---|---|---|---|---|---|---|
| Example 1 | 2.5 | 1 | 5 | 5 | 4 | 20% | One surface opposite light source | 57.9 | 110.5% | Good | 70.5 | 10.1 | 60.4 |
| Example 2 | 2.5 | 1 | 5 | 5 | 4 | 20% | One surface on light source side | 58.6 | 111.8% | Good | 70.3 | 10.3 | 60 |
| Example 3 | 2.5 | 1 | 5 | 5 | 4 | 20% | Both surfaces | 60.6 | 115.6% | Good | 85.2 | 10.5 | 74.7 |
| Comparative Example 1 | — | — | — | — | — | — | — | 52.4 | 100.0% | Poor | 4.9 | 4.8 | 0.1 |

TABLE 1-continued

| | R | h | P | H$^1$ | H$^2$ | h/2R | Light-diffusing layer | Light energy conversion efficiency (%) | Conversion improvement rate | Color evaluation (visual) | Total haze (%) | Internal haze (%) | External haze (%) |
|---|---|---|---|---|---|---|---|---|---|---|---|---|---|
| Comparative Example 2 | 10 | 0.1 | 20 | 20 | 19.9 | 1% | Both surfaces | 52.6 | 100.4% | Poor | 60.3 | 10.4 | 49.9 |
| Example 4 | 10 | 0.6 | 20 | 20 | 19.4 | 3% | Both surfaces | 53.5 | 102.1% | Acceptable | 72.1 | 10.1 | 62 |
| Example 5 | 5 | 0.5 | 10 | 10 | 9.5 | 5% | Both surfaces | 54.6 | 104.2% | Acceptable | 75.3 | 10.3 | 65 |
| Example 6 | 2.5 | 0.5 | 5 | 5 | 4.5 | 10% | Both surfaces | 57.0 | 108.8% | Acceptable | 85.5 | 10.5 | 75 |
| Example 7 | 2.5 | 1.5 | 5 | 5 | 3.5 | 30% | Both surfaces | 62.3 | 118.9% | Good | 87.2 | 9.9 | 77.3 |
| Example 8 | 2.5 | 2 | 5 | 5 | 3 | 40% | Both surfaces | 63.1 | 120.4% | Good | 90.3 | 10.1 | 80.2 |
| Example 9 | 2.5 | 2.5 | 5 | 5 | 2.5 | 50% | Both surfaces | 63.7 | 121.6% | Good | 95.1 | 10.2 | 84.9 |
| Example 10 | 5 | 1 | 30 | 10 | 9 | 10% | Both surfaces | 53.1 | 101.3% | Acceptable | 85.3 | 10.3 | 75 |
| Example 11 | 5 | 1 | 20 | 10 | 9 | 10% | Both surfaces | 53.9 | 102.9% | Acceptable | 85.2 | 10.1 | 75.1 |
| Example 12 | 5 | 1 | 17 | 10 | 9 | 10% | Both surfaces | 54.4 | 103.8% | Acceptable | 85.2 | 10.1 | 75.1 |
| Example 13 | 5 | 1 | 14 | 10 | 9 | 10% | Both surfaces | 54.3 | 103.6% | Acceptable | 85.5 | 10.4 | 75.1 |
| Example 14 | 2.5 | 1 | 5 | 5 | 4 | 20% | One surface opposite light source | 64.0 | 122.1% | Good | 95.2 | 90.2 | 5 |
| Example 15 | 2.5 | 1 | 5 | 5 | 4 | 20% | One surface opposite light source | 64.2 | 122.5% | Good | 96.5 | 91.5 | 5 |
| Example 16 | 2.5 | 1 | 5 | 5 | 4 | 20% | One surface opposite light source | 64.2 | 122.5% | Good | 96.2 | 91.3 | 4.9 |
| Example 17 | 2.5 | 1 | 5 | 5 | 4 | 20% | One surface opposite light source | 58.9 | 112.4% | Good | 85.5 | 40.9 | 44.6 |
| Example 18 | 2.5 | 1 | 5 | 5 | 4 | 20% | One surface opposite light source | 59.1 | 112.8% | Good | 86.1 | 41.5 | 44.6 |
| Example 19 | 2.5 | 1 | 5 | 5 | 4 | 20% | One surface opposite light source | 59.2 | 113.0% | Good | 86.7 | 41.8 | 44.9 |

Table 1 shows that the light-diffusing layered bodies according to the examples, in which a light-diffusing layer with predetermined projections and depressions was disposed on at least one surface of the wavelength conversion layer, had excellent light energy conversion efficiency for blue light irradiated from the light source. Accordingly, display devices including the light-diffusing layered bodies according to the examples had excellent light energy conversion efficiency.

Comparison between the light-diffusing layered bodies according to Examples 1 and 2 shows that in the case of disposing a light-diffusing layer on one surface of the wavelength conversion layer, disposing the light-diffusing layer on the light source-side surface resulted in better light energy conversion efficiency.

Comparison between the light-diffusing layered bodies according to Examples 1 and 2 and the light-diffusing layered body according to Example 3 shows that disposing the light-diffusing layer on both surfaces of the wavelength conversion layer resulted in better light energy conversion efficiency.

Comparison between the light-diffusing layered bodies according to Example 3 and 4 to 9 shows that light-diffusing particles protruding further resulted in better light energy conversion efficiency.

Comparison between the light-diffusing layered bodies according to Example 5 and 10 to 13, a higher density (projection density) of the light-diffusing particles resulted in better light energy conversion efficiency.

Comparison between the light-diffusing layered bodies according to Examples 14 to 19 and the light-diffusing layered body according to Example 1 shows that Examples 14 to 19, in which the wavelength conversion layer contained internal scattering particles, achieved better light energy conversion efficiency.

The light-diffusing layered bodies according to Comparative Examples 1 and 2 had poor light energy conversion efficiency, because the light-diffusing layered body according to Comparative Example 1 employed a light-diffusing layer free of light-diffusing particles, and the light-diffusing layer according to Comparative Example 2 had the light-diffusing particles insufficiently protruding from the outermost surface of the light-diffusing layer.

Table 1 shows that the light-diffusing layered bodies according to the examples gave good results in the visual color evaluation as well as had excellent light energy conversion efficiency.

Reference Example 1

In the preparation of the light-diffusing layer in Example 1 described above, the light-diffusing particles may be irregularly shaped particles having a broad particle size distribution.

Reference Example 2

In the preparation of the light-diffusing layer in Example 1 describe above, the light-diffusing particles may be cross-linked acrylic resin beads or particles of a layered inorganic compound.

The layered inorganic compound is not limited. Examples thereof include smectites such as montmorillonite, beidellite, nontronite, saponite, hectorite, sauconite, and stevensite, vermiculite, halloysite, kaolinite, endellite, dickite, talc, pyrophyllite, mica, margarite, white mica, bronze mica, tetra-silicic mica, taeniolite, antigorite, chlorite, cookeite, and pennantite. These layered inorganic compounds may be natural products or synthetic products. The layered inorganic compounds may be subjected to organic surface treatment.

If the light-diffusing particles are not monodispersed particles (particles with a single shape), the particles with different sizes and shapes each have the surface diffusion effect or the internal diffusion effect, thus improving the light energy conversion efficiency.

INDUSTRIAL APPLICABILITY

The display device of the present invention, which has the above-described structure, is excellent in light energy conversion efficiency.

REFERENCE SIGNS LIST 11 light-diffusing layer
12 light-diffusing particles
13 binder component 20 light source
21 frame
22 blue LED
200 wavelength conversion layer
210 binder resin
220 red semiconductor particle
230 green semiconductor particle

The invention claimed is:

1. A display device comprising:
a light-diffusing layered body;
a liquid crystal cell; and
a display screen,
wherein the light-diffusing layered body comprises:
  a wavelength conversion layer comprising optically isotropic semiconductor particles; and
  a light-diffusing layer on at least one surface of the wavelength conversion layer,
the light-diffusing layer is disposed on a surface of the wavelength conversion layer opposite to a light source-side or on both surfaces of the wavelength conversion layer,
the light-diffusing layer comprises:
  a binder component; and
  light-diffusing particles that contain an organic material or an inorganic material,
the light-diffusing layer has projections and depressions on an outermost surface thereof, which are formed of the light-diffusing particles protruding therefrom,
the light-diffusing particles protrude in a range from 3 to 50% of a particle size of the light-diffusing particles from the outermost surface of the light-diffusing layer,
the light-diffusing layer has a film thickness of 1 to 30 μm,
the display device is a liquid crystal display device, and
the liquid crystal cell is formed on the light-diffusing layered body and at a display screen side relative to the light-diffusing layered body.

2. The display device according to claim 1,
wherein the light-diffusing particles contained in the light-diffusing layer are arranged so as to form a layer, and
70% or more of the light-diffusing particles arranged so as to form the layer are not stacked.

3. The display device according to claim 1,
wherein a difference in a refractive index between the light-diffusing particles and the binder component in the light-diffusing layer is in a range from 0.02 to 0.15.

4. The display device according to claim 1,
wherein the wavelength conversion layer comprises:
  optically isotropic semiconductor particles;
  a binder resin; and
  internal scattering particles, and
the internal scattering particles have a higher refractive index than a refractive index of the binder resin.

* * * * *